(12) United States Patent
Chen et al.

(10) Patent No.: US 9,675,955 B2
(45) Date of Patent: Jun. 13, 2017

(54) PHOTOCATALYTIC REACTION SYSTEM

(71) Applicant: ZHONGYING CHANGJIANG INTERNATIONAL NEW ENERGY INVESTMENT CO., LTD., Wuhan (CN)

(72) Inventors: Yilong Chen, Wuhan (CN); Qingping Yang, Wuhan (CN); Yanfeng Zhang, Wuhan (CN)

(73) Assignee: ZHONGYING CHANGJIANG INTERNATIONAL NEW ENERGY INVESTMENT CO., LTD., Wuhan (CN)

( * ) Notice: Subject to any disclaimer, the term of this patent is extended or adjusted under 35 U.S.C. 154(b) by 0 days.

(21) Appl. No.: 14/995,172

(22) Filed: Jan. 13, 2016

(65) Prior Publication Data
US 2016/0121295 A1 May 5, 2016

Related U.S. Application Data

(63) Continuation-in-part of application No. PCT/CN2014/080123, filed on Jun. 17, 2014.

(30) Foreign Application Priority Data

Jul. 15, 2013 (CN) .......................... 2013 1 0294178

(51) Int. Cl.
*B01J 19/12* (2006.01)
*C01B 3/04* (2006.01)
(Continued)

(52) U.S. Cl.
CPC ............. *B01J 19/127* (2013.01); *C01B 3/042* (2013.01); *C01B 3/22* (2013.01); *C01B 13/0207* (2013.01);
(Continued)

(58) Field of Classification Search
CPC ............ B01J 19/127; B01J 2219/00144; B01J 2219/0871; B01J 2219/0875;
(Continued)

(56) References Cited

U.S. PATENT DOCUMENTS 4,233,127 A * 11/1980 Monahan ............... B01J 19/127
204/157.5
2009/0321244 A1* 12/2009 Smith .................... B01J 19/127
204/157.52

* cited by examiner

*Primary Examiner* — Lessanework Seifu
(74) *Attorney, Agent, or Firm* — Matthias Scholl P.C.; Matthias Scholl

(57) ABSTRACT

A photocatalytic reaction system by collecting sunlight, the system including: a light collector, a light conduction device, and a photoreactor. A transparent protective cover is disposed on the top of a housing of the light collector. A light-collecting convex lens group is disposed beneath the protective cover in the transmission direction of the sunlight. The housing of the light collector is provided with a solar radiation measuring device. An azimuthal main shaft and the pitch main shaft are separately provided with the servo motors and are rotatable in relation to each other by tracking the sunlight under the drive of the separate servo motors. The sunlight collected by the light-collecting convex lens group is converged into a convergent light when passing through the light conduction device and the convergent light is directed to the photoreactor. The photoreactor functions to transmit full-spectrum rays of sunlight.

20 Claims, 9 Drawing Sheets

(51) Int. Cl.
*F24J 2/06* (2006.01)
*C01B 3/22* (2006.01)
*C01B 13/02* (2006.01)
*F24J 2/08* (2006.01)
*F24J 2/16* (2006.01)
*F24J 2/18* (2006.01)
*F03G 6/06* (2006.01)

(52) U.S. Cl.
CPC ............... *F24J 2/067* (2013.01); *F24J 2/08* (2013.01); *F24J 2/16* (2013.01); *F24J 2/18* (2013.01); *B01J 2219/0801* (2013.01); *B01J 2219/0871* (2013.01); *B01J 2219/0875* (2013.01); *B01J 2219/1203* (2013.01); *C01B 2203/0277* (2013.01); *C01B 2203/10* (2013.01); *C01B 2203/1223* (2013.01); *F03G 6/06* (2013.01); *Y02E 10/46* (2013.01); *Y02E 60/364* (2013.01)

(58) Field of Classification Search
CPC .... B01J 2219/1203; C01B 3/22; C01B 3/042; C01B 3/06; C01B 3/061; F24J 2/16; F24J 2/067; F24J 2/08; F24J 2/18
See application file for complete search history.

PHOTOCATALYTIC REACTION SYSTEM

CROSS-REFERENCE TO RELATED APPLICATIONS

This application is a continuation-in-part of International Patent Application No. PCT/CN2014/080123 with an international filing date of Jun. 17, 2014, designating the United States, now pending, and further claims priority benefits to Chinese Patent Application No. 201310294178.7 filed Jul. 15, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a photocatalytic reaction system.

Description of the Related Art

Photocatalytic reaction for hydrogen or methanol production requires stable visible light. Due to the instability of sunlight, non-natural light sources are often adopted. For example, xenon lamp light can be used. However, such non-natural light sources have low catalytic efficiency.

Thus, it would be useful to develop a system to improve the stability and usefulness of the sunlight as applied to the photocatalytic reaction for hydrogen or methanol production.

SUMMARY OF THE INVENTION

In view of the above-described problems, it is one objective of the invention to provide a photocatalytic reaction system that has simple structure and is capable of self-adaptively tracking and collecting the sunlight according to the change of the environment, so that the photocatalytic reaction can be carried out under the full-spectrum rays of the sunlight.

To achieve the above objective, in accordance with one embodiment of the invention, there is provided a photocatalytic reaction system. The system comprises: a light collector, a light conduction device, and a photoreactor. The light collector comprises: a housing, a protective cover, a light-collecting convex lens group, a solar radiation measuring device, a two-degree-of-freedom (2-DOF) bracket, a base, servo motors, and a data collection control box. The 2-DOF bracket comprising a pitch main shaft and an azimuthal main shaft. The photoreactor comprises: a light transmitting cylinder, a sealing cover, a reaction gas inlet, reaction gas outlets, a reaction solution inlet, a reaction solution outlet, a temperature sensor, and a pressure sensor. The protective cover is transparent and disposed on a top of the housing of the light collector. The light-collecting convex lens group is formed by at least one lens arranged in multiple layers, and the light-collecting convex lens group is disposed beneath the protective cover in a transmission direction of the sunlight. The housing of the light collector is provided with the solar radiation measuring device. The pitch main shaft and the azimuthal main shaft are connected to form the 2-DOF bracket. A bottom of the housing of the light collector is fixed on an end of the pitch main shaft. The azimuthal main shaft is disposed at a bottom of the 2-DOF bracket and connected to the base via a bearing. The azimuthal main shaft and the pitch main shaft are separately provided with the servo motors and able to rotate in relation to each other by tracking the sunlight under the drive of the separate servo motors. The base is provided with the data collection control box. The sunlight collected by the light-collecting convex lens group is converged into a convergent light when passing through the light conduction device and the convergent light is directed to the photoreactor. The photoreactor is capable of transmitting full-spectrum rays of sunlight. The sealing cover is disposed on the light transmitting cylinder. The light transmitting cylinder is filled with a reaction solution, and the reaction solution communicates with an external via the reaction gas inlet, the reaction gas outlets, the reaction solution inlet, and the reaction solution outlet disposed on the photoreactor. The photoreactor is provided with the temperature sensor and the pressure sensor. The temperature sensor, the pressure sensor, and the solar radiation measuring device are in signal connection with the data collection control box, and the data collection control box is in electric connection with the servo motors.

In a class of this embodiment, the light-collecting convex lens group is the multiple layers of the convex lenses distributed from the top down in a direction of an optical path. Focuses of at least two convex lenses of a top layer fall on an adjacent next layer of the convex lenses, distribution of the focuses of the convex lenses of a following layer is in the same way, and the focuses of the convex lenses of a penultimate layer fall on the convex lens of a bottom layer. The light conduction device is a flexible fiber-optic bundle and the convex lens of the bottom layer is coupled to the fiber-optic bundle. Or, the light conduction device is a light conduction cylinder, a concave lens is disposed beneath the convex lens of the bottom layer of the light-collecting convex lens group, the concave lens and the light-collecting convex lens group together form a convex-concave lens group, and the convex-concave lens group is coupled to the light conduction cylinder and converts the sunlight into a parallel light.

In a class of this embodiment, the light conduction device is the flexible fiber-optic bundle, and a front end thereof is vertically fixed on the housing of the light collector. A focus of the convex lens of the bottom layer of the light-collecting convex lens group falls on a light receiving face of the flexible fiber-optic bundle. A rear end of the flexible fiber-optic bundle is provided with a rear end lens group for converging and directing the light to the light transmitting cylinder.

In a class of this embodiment, the light conduction device is the light conduction cylinder having a front end being vertically fixed. The convex-concave lens group coupled to the light conduction cylinder is disposed in the housing of the light collector. The pitch main shaft and the azimuthal main shaft connected to the housing of the light collector are both hollow cylinders having inner walls provided with reflective films, and the optical paths in the hollow cylinders of the pitch main shaft and the azimuthal main shaft communicate with each other. A pair of reflectors is disposed in parallel in the pitch main shaft, and an angle between an axis of the pitch main shaft and each reflector is 45°. A convex lens is disposed at a bottom of the azimuthal main shaft, an angle between an axis of the azimuthal main shaft and the convex lens is 90°, a focus of the convex lens falls in an inlet of the front end of the light conduction cylinder, and the focus of the convex lens coincides with an axis of the light conduction cylinder at 12:00 of local astronomical time. A rear end of the light conduction cylinder is provided with a rear end lens group for converting the light into the parallel light and transmitting the parallel light to the light conduction cylinder.

In a class of this embodiment, the light conduction device comprises at least one flection. The light passing through the rear end lens group is directed to the light transmitting cylinder via a sidewall or a bottom of the light transmitting cylinder.

In a class of this embodiment, the protective cover, the convex lenses, the concave lens, the fiber-optic bundle, and the rear end lens group are all made of materials that are capable transmitting the full-spectrum rays of the sunlight. Materials of the reflectors and a reflective film covered on an inner surface of the light conduction cylinder have an absorption rate or a filtration rate of an ultraviolet light, a visible light, and an infrared light of ≤6%.

In a class of this embodiment, a power module, a CPU module, a communication module, a signal input module, a signal output module, a storage module, and mounting rails are disposed inside the data collection control box. The modules are fixed on a casing of the data collection control box via the mounting rails, respectively. System serial ports, an input/output signal interface, and a power interface are disposed on a sidewall of the data collection control box. The communication module in the control box communicates with an upper PC via the system serial ports. The signal input module, the signal output module are in signal connection with the solar radiation measuring device and the servo motors respectively via the input/output signal interface. The power interface is connected to an external power, and the external power adopts an AC 220V power, a DC24V power, or a silicon photovoltaic cell.

In a class of this embodiment, the reaction solution inlet is disposed on a sidewall of the light transmitting cylinder, and the reaction solution outlet is disposed on a bottom of the light transmitting cylinder. The sealing cover is provided with a plurality of the reaction gas outlets, and the reaction gas inlet for inserting a reaction gas tube into the reaction solution at the bottom of the light transmitting cylinder. The temperature sensor is inserted into the reaction solution in the light transmitting cylinder. A pressure transmission tube of the pressure sensor is disposed in a gas region in the light transmitting cylinder.

Advantages of the photocatalytic reaction system according to embodiments of the invention are summarized as follows:

Compared with the artificially simulated light apparatus by the xenon lamps, the photocatalytic reaction system of the invention is adapted to automatically track the elevation angle and the azimuth angle of the sun via the 2-DOF light collector under the control of the servo control system, to collect, converge and transmit the sunlight via the optical system comprising multiple lenses and the light conduction device, and to fluently transmit the sunlight to the indoor photoreactor, so that the process of photocatalytic decomposition of $H_2O$ for hydrogen production and the process of photocatalytic decomposition of ($H_2O+CO_2$) for methanol production are conducted under the full-spectrum rays of the sunlight in a real sense.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a photocatalytic reaction system by collecting sunlight are described below. It should be noted that the following examples are intended to describe and not to limit the invention.

Example 1

In this example, a light conduction cylinder is adopted as a light transmission unit.

Figure 1:
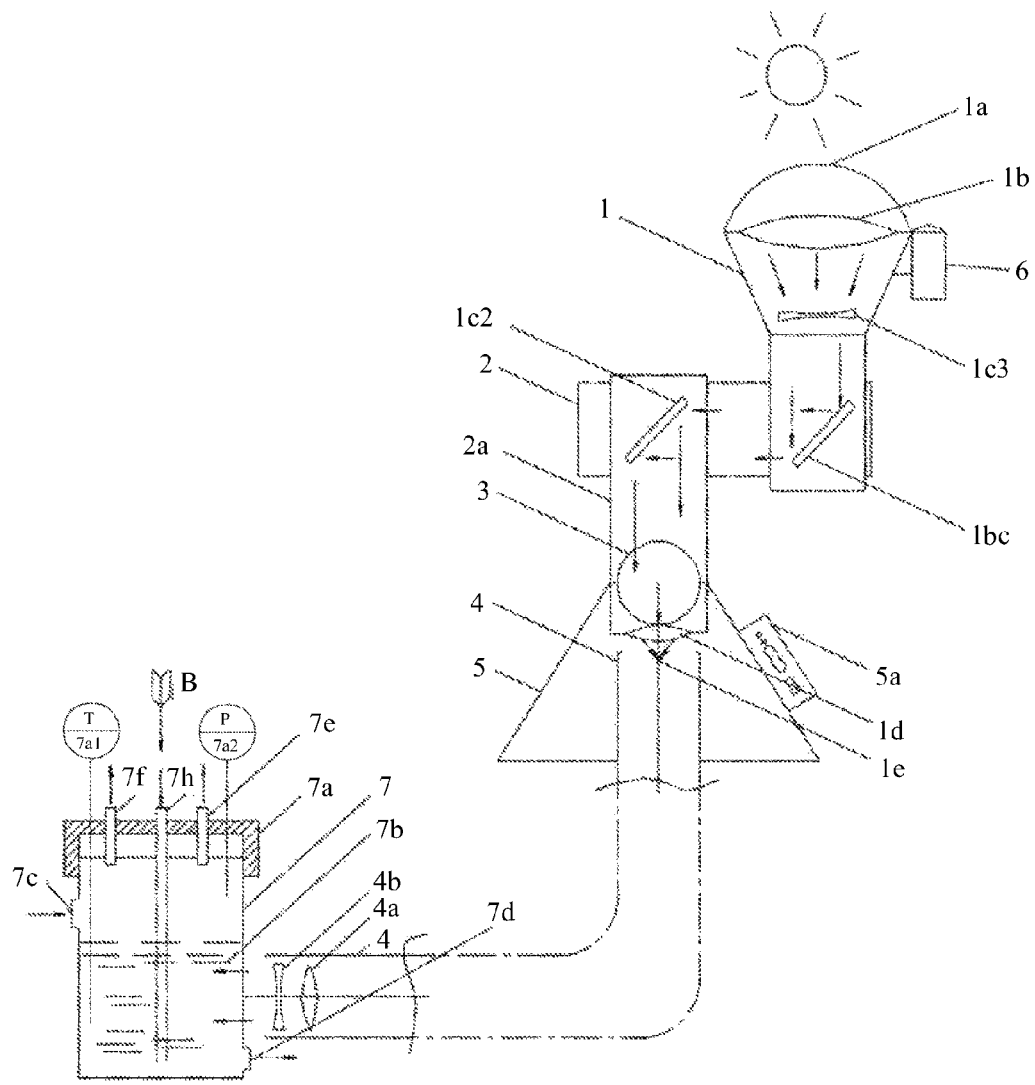
FIG. 1 is a structure diagram of a photocatalytic reaction system adopting a light conduction cylinder for transmitting sunlight according to one embodiment of the invention.
Figure 2:
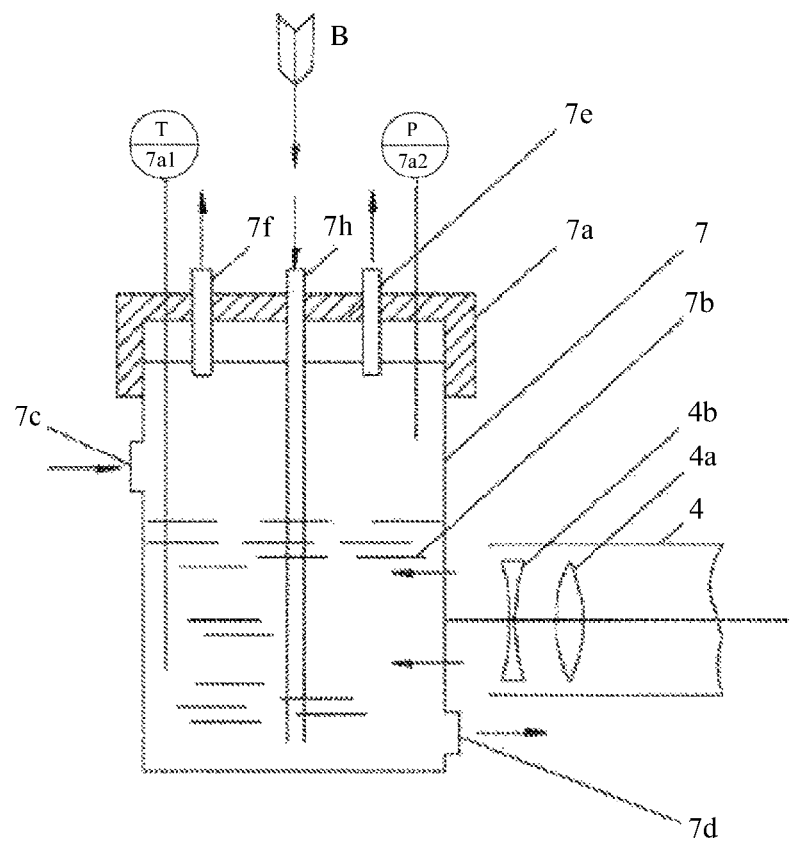
FIG. 2 is a structure diagram showing connection between a photoreactor and a light conduction cylinder adopted as a light conduction device according to one embodiment of the invention.
Figure 3:
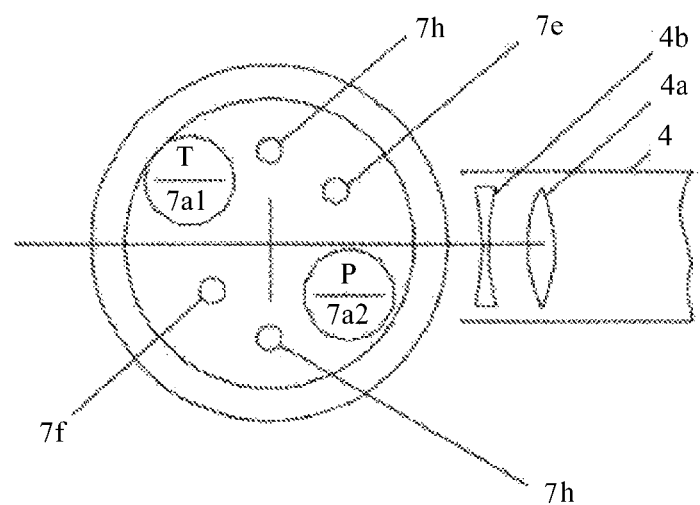
FIG. 3 is a view taken from a B-side of FIG. 2.

As shown in FIGS. 1-3, a light collector 1 is provided with a protective cover 1a that is made of a transparent material and is able to allow the sunlight to pass through. A solar radiation measuring device 6 is installed on a housing of the light collector, and a top of the light collector is provided with a convex lens 1b for converging the sunlight. A concave lens 1bc is disposed beneath the convex lens 1b. The sunlight is converted into a parallel light under cooperative actions of the convex lens 1b and the concave lens 1bc. A lower part of the light collector is fixed on a right end of a pitch main shaft 2 in the form of a hollow cylinder. A first plane mirror 1c1 is disposed in the right end of the pitch main shaft 2, and a second plane mirror 1c2 is disposed in a left end of the pitch main shaft 2. The first plane mirror 1c1 and the second plane mirror 1c2 are arranged in parallel, an angle between each of the two plane mirrors and an axis of the pitch main shaft 2 is 45°, and both the two plane mirrors are fixed in the hollow cylinder of the pitch main shaft 2.

The pitch main shaft 2 and an azimuthal main shaft 2a are both hollow cylinders having inner walls provided with reflective films. The left end of the pitch main shaft 2 is mounted on an upper part of the azimuthal main shaft 2a, and a lower part of the azimuthal main shaft 2a is connected to a base 5 via a bearing 3. The azimuthal main shaft 2a and the pitch main shaft 2 form a 2-DOF bracket, and the right end of the pitch main shaft 2 is a free end. A bottom part of the azimuthal main shaft 2a is provided with a front end convex lens 1d of the light conduction cylinder 4.

Figure 9:
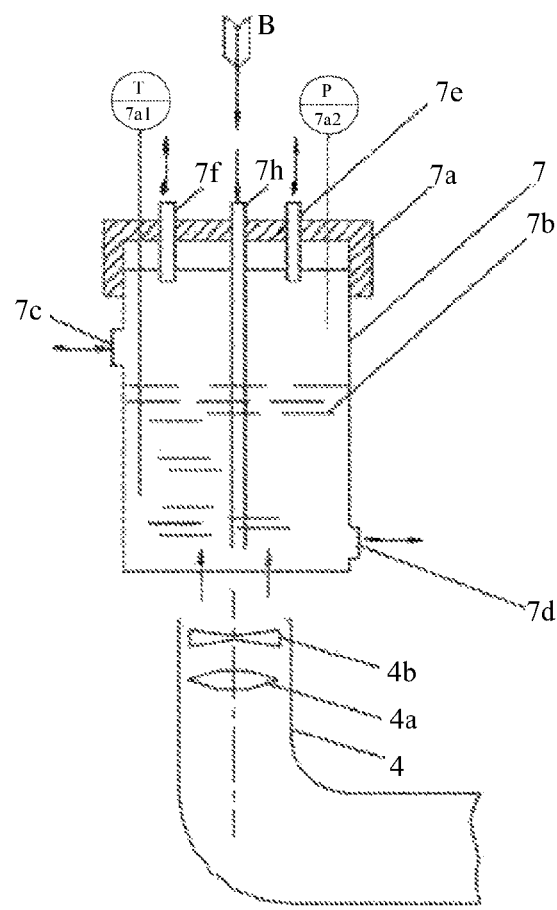
FIG. 9 is a structure diagram showing an optical path of a rear end of a light conduction device being transmitted into a light transmitting cylinder of a photoreactor from a bottom thereof according to one embodiment of the invention.
Figure 10:
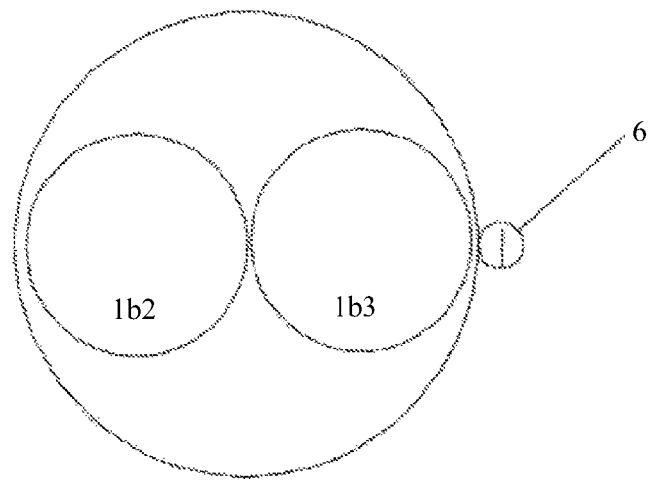
FIGS. 10-13 are structure diagrams showing a top layer of convex lenses formed by a combination of two, three, four, and five convex lenses according to one embodiment of the invention.
Figure 11:
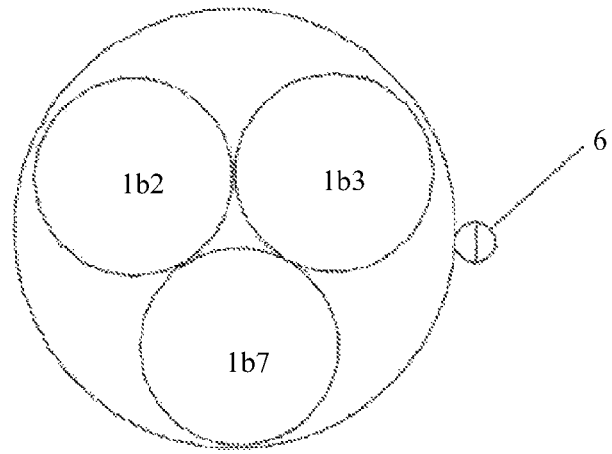
Figure 12:
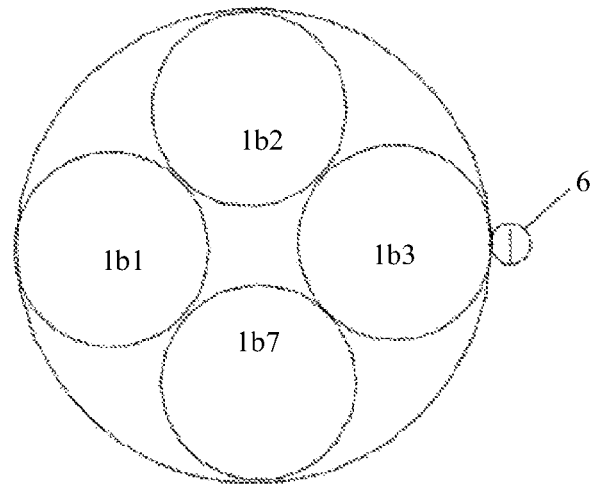
Figure 13:
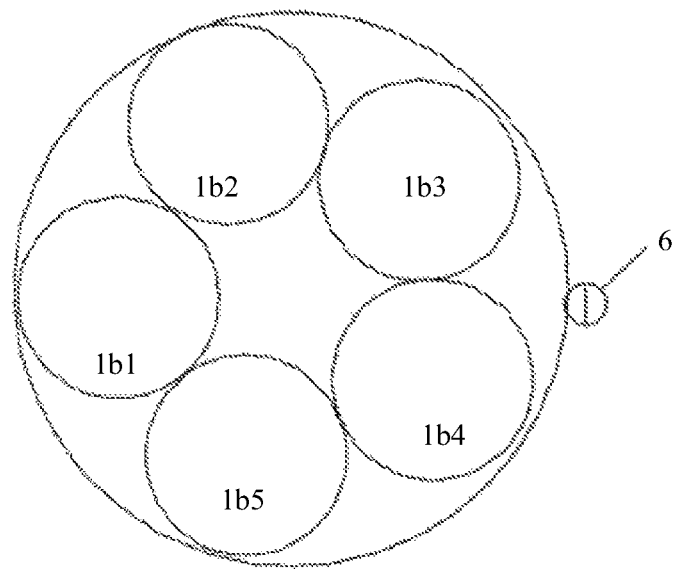

The light conduction cylinder 4 is fixed on the base 5. A focus 1e of the front end convex lens 1d of the light conduction cylinder 4 is required to fall in a front end inlet of the light conduction cylinder 4 and coincide with an axis of the light conduction cylinder 4 at 12:00 of local astronomical time (the time when a distance between a local region and the sun is nearest in one day) when the light intensity is strongest. An inner surface of the light conduction cylinder 4 is attached with the reflective film coated with silver or aluminum, and a transmission direction of the sunlight introduced therein changes along with a reflection of the light conduction cylinder. A rear end of the light conduction cylinder is provided with a lens group formed by a convex lens 4a and a concave lens 4b, and the sunlight is converted into the parallel light by the lens group and then transmitted to a barrel-shaped photoreactor 7 made of a transparent material suitable for sunlight transmission (the material can be a borosilicate glass or a polymer material, such as a polymethylmethacrylate (PMMA) material or a poly(ethylene terephthalate) (PET) material). The convergent sunlight is directed to a sidewall of the photoreactor 7 and introduced into the photoreactor 7 via the sidewall thereof. FIG. 9 illustrates that the convergent sunlight can also be directed to a bottom of the photoreactor 7 and introduced into the photoreactor via the bottom thereof.

The photoreactor 7 is formed by a light transmitting cylinder (that permits a full-spectrum of the sunlight to pass through) and a sealing cover 7a. A mixed reaction solution 7b added with adaptive catalysts is placed in the barrel-shaped light transmitting cylinder. An upper part of the light transmitting cylinder is provided with an inlet 7c of the mixed reaction solution, and a bottom of the light transmitting cylinder is provided with an outlet 7d of the mixed reaction solution. The sealing cover of the photoreactor 7 is provided with a reaction gas outlet 7f, a reaction gas inlet 7e, a carbon dioxide inlet 7h for inserting a tube into the bottom of the light transmitting cylinder, a temperature sensor 7a1 inserted into a liquid region in the light transmitting cylinder, and a pressure sensor 7a2 having a pressure transmission tube in a gas region in the light transmitting cylinder.

Figure 14:
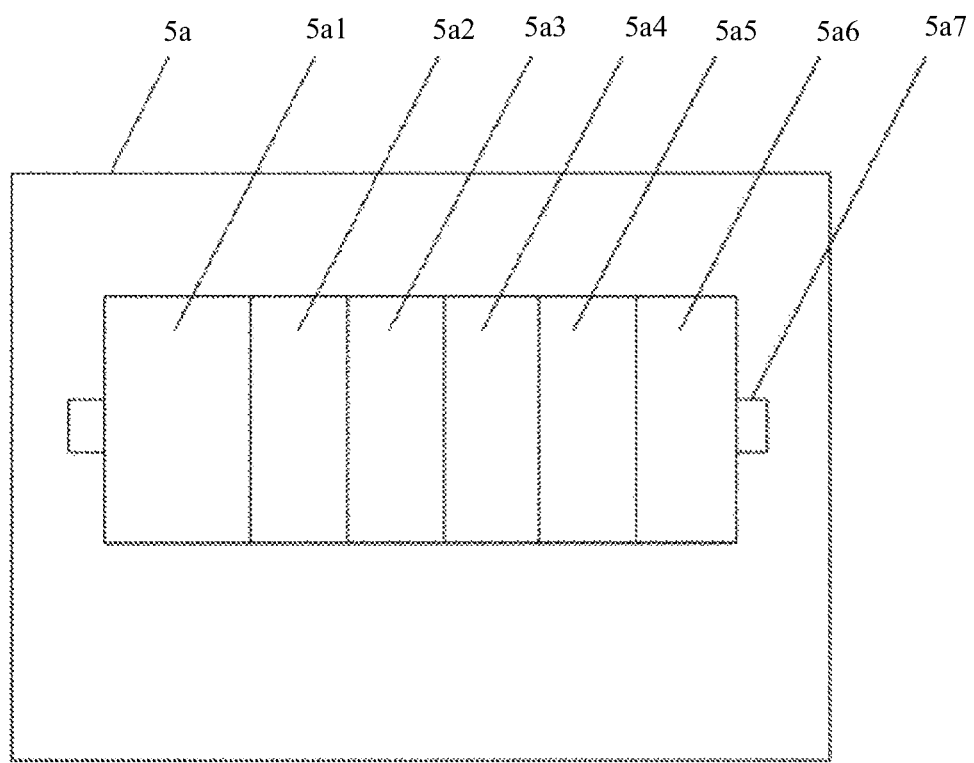
FIG. 14 is a structure diagram showing arrangement of modules inside a data collection control box according to one embodiment of the invention.
Figure 15:
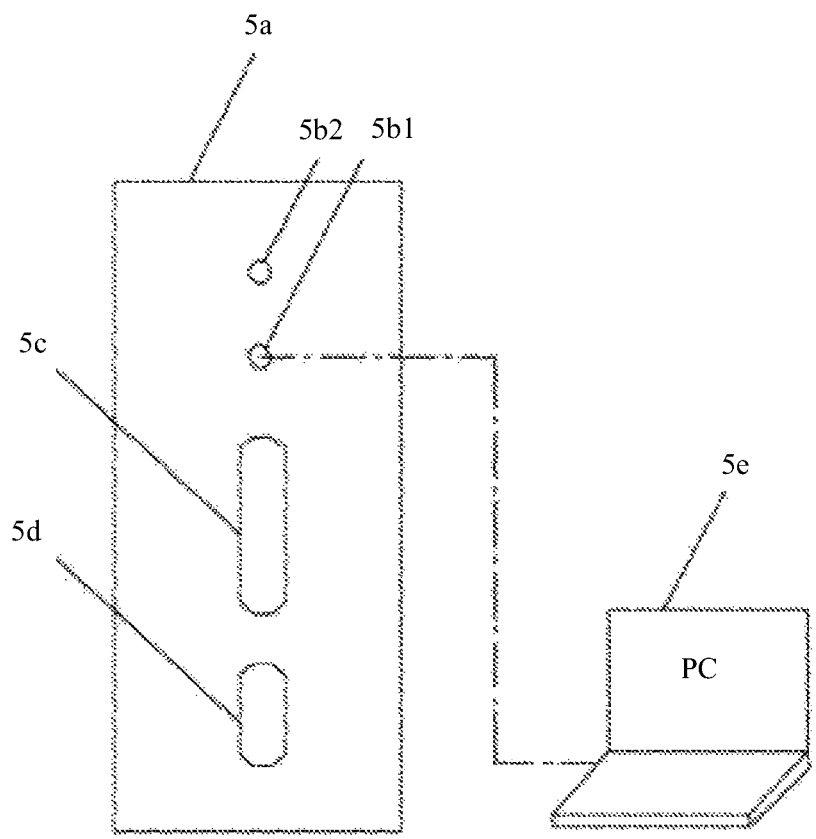
FIG. 15 is a structure diagram showing connection between a data connection control box and a PC according to one embodiment of the invention.

The base 5 is further provided with a data collection control box 5a, and an inner structure of the data collection control box 5a is illustrated in FIG. 14. A power module 5a1, a CPU module 5a2, a communication module 5a3, a signal input module 5a4, a signal output module 5a5, a storage module 5a6, and mounting rails 5a7 are disposed inside the data collection control box 5a. A sidewall of the data collection control box 5a is provided with system serial ports 5b1, 5b2, an input/output signal interface 5c, and a power interface 5d. A power adopts an AC 220V power, a DC24V power, other powers, or a silicon photovoltaic cell. A comprehensive control software in the CPU module and the functional modules together accomplish the following operations: data collections of equipment self-checking, solar radiation, and the azimuth angle and the elevation angle of the normal line of the convex lens group, data collection of the elevation angle of the pitch main shaft, data collection of the azimuth angle of the azimuthal main shaft, and the movement controlled by the servo units. The comprehensive control software communicates the upper PC 5e via the serial port 5b1, and then a functional software in the upper PC treats and displays the measured data, as shown in FIG. 15.

Working principle of the photocatalytic reaction system of the invention is as follows: the sunlight tracking device of the photocatalytic reaction system firstly operates according to the astronomical azimuth of the sun to realize the automatic tracking of the sun. In the meanwhile, the sunlight tracking device also periodically measures the sunlight in the day time to realize the real-time close loop control of the system (for example, the real-time control system for the close loop control is switched for five minutes at each time point of every integer hour to substitute the sunlight tracking mode according to the astronomical azimuth.) and to revise the automatically tracked data of the astronomical azimuth of the sun, so that the light receiving and converging components are always directed at the sun. Herein, the condition for the close loop control is as follows: the time period should be in the sunny day. In cloudy day the sunlight cannot be measured, the light irradiation signal is scare, therefore the close loop control cannot be realized. It can be set that when the light radiation intensity is lower than 60% of a daily average value in a whole year, it is determined to be a cloudy day, and in such period, the sunlight tracking device is not switched to the close loop control mode but continues operating according to the astronomical azimuth. Then the sunlight is output by the light conduction components to the photoreactor where the photoreaction is carried out. The measured data are then treated and displayed by the functional software in the upper PC.

Example 2

Figure 4:
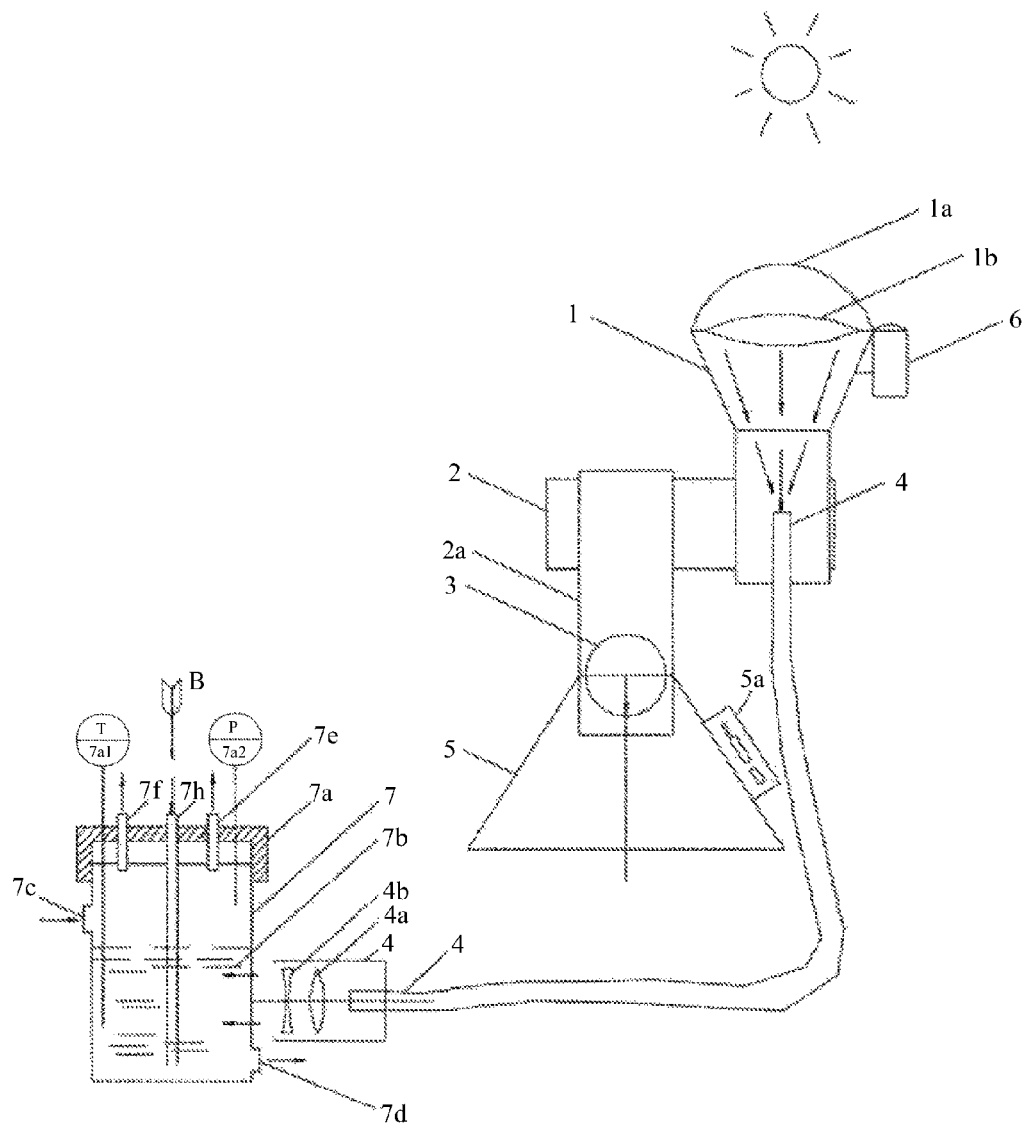
FIG. 4 is a structure diagram of a photocatalytic reaction system adopting a flexible fiber-optic bundle for transmitting sunlight according to one embodiment of the invention.
Figure 5:
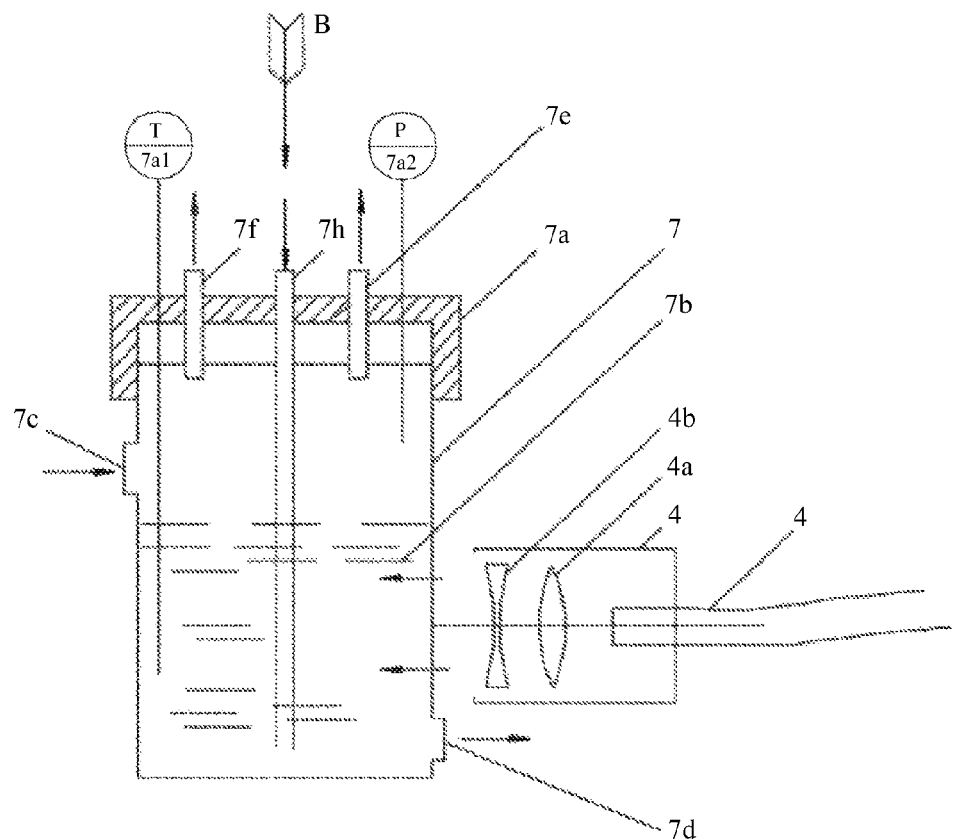
FIG. 5 is a structure diagram showing connection between a photoreactor and a flexible fiber-optic bundle adopted as a light conduction device according to one embodiment of the invention.
Figure 6:
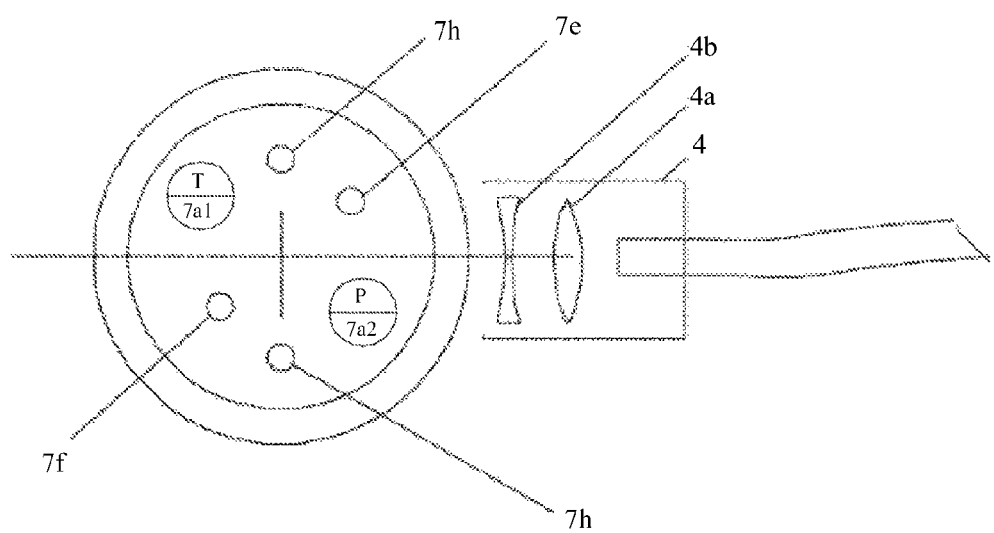
FIG. 6 is a view taken from a B-side of FIG. 5.

In this example, a fiber-optic bundle is adopted as the light transmission part. As shown in FIGS. 4-6, a light collector 1 is provided with a protective cover 1a that is made of a transparent material and is able to allow the sunlight to pass through. A solar radiation measuring device 6 is installed on a housing of the light collector, and a top of the light collector is provided with a convex lens 1b for converging the sunlight. A central axis of a lower part of the light collector is provided with a flexible fiber-optic bundle 4. A front end of the flexible fiber-optic bundle is fixed on the housing of the light collector to enable a focus of the convex lens 1b to fall on a light receiving surface of the front end of the flexible fiber-optic bundle. A rear end of the flexible fiber-optic bundle 4 is connected to a rear end lens group which is formed by a convex lens 4a and a concave lens 4b. The light transmitted from the rear end lens group is directed to a barrel-shaped photoreactor 7 made of a transparent material suitable for sunlight transmission (the material can be the borosilicate glass or the polymer material, such as the PMMA material or the PET material). The convergent sunlight is directed to a sidewall of the photoreactor 7 and introduced into the photoreactor 7 via the sidewall thereof. FIG. 9 illustrates that the convergent sunlight can also be directed to a bottom of the photoreactor 7 and introduced into the photoreactor via the bottom thereof.

The photoreactor 7 is formed by a light transmitting cylinder (that permits a full-spectrum of the sunlight to pass through) and a sealing cover 7a. A mixed reaction solution 7b added with adaptive catalysts is placed in the barrel-shaped light transmitting cylinder. An upper part of the light transmitting cylinder is provided with an inlet 7c of the mixed reaction solution, and a bottom of the light transmitting cylinder is provided with an outlet 7d of the mixed reaction solution. The sealing cover of the photoreactor 7 is provided with a reaction gas outlet 7f, a reaction gas inlet 7e, a carbon dioxide inlet 7h for inserting a tube into the bottom of the light transmitting cylinder, a temperature sensor 7a1 inserted into a liquid region in the light transmitting cylinder, and a pressure sensor 7a2 having a pressure transmission tube in a gas region in the light transmitting cylinder.

The base 5 is further provided with a data collection control box 5a, and an inner structure of the data collection control box 5a is illustrated in FIG. 14. A power module 5a1, a CPU module 5a2, a communication module 5a3, a signal input module 5a4, a signal output module 5a5, a storage module 5a6, and mounting rails 5a7 are disposed inside the data collection control box 5a. A sidewall of the data collection control box 5a is provided with system serial ports 5b1, 5b2, an input/output signal interface 5c, and a power interface 5d. A power adopts an AC 220V power, a DC24V power, other powers, or a silicon photovoltaic cell. A comprehensive control software in the CPU module and the functional modules together accomplish the following operations: data collections of equipment self-checking, solar radiation, and the azimuth angle and the elevation angle of the normal line of the convex lens group, data collection of the elevation angle of the pitch main shaft, data collection of the azimuth angle of the azimuthal main shaft, and the movement controlled by the servo units. The comprehensive control software communicates the upper PC 5e via the serial port 5b1, and then a functional software in the upper PC treats and displays the measured data, as shown in FIG. 15.

Working principle of the photocatalytic reaction system of the invention is as follows: the sunlight tracking device of the photocatalytic reaction system firstly operates according to the astronomical azimuth of the sun to realize the automatic tracking of the sun. In the meanwhile, the sunlight tracking device also periodically measures the sunlight in the day time to realize the real-time close loop control of the system (for example, the real-time control system for the close loop control is switched for five minutes at each time point of every integer hour to substitute the sunlight tracking mode according to the astronomical azimuth.) and to revise the automatically tracked data of the astronomical azimuth of the sun, so that the light receiving and converging components are always directed at the sun. Herein, the condition for the close loop control is as follows: the time period should be in the sunny day. In cloudy day the sunlight cannot be measured, the light irradiation signal is scare, therefore the close loop control cannot be realized. It can be set that when the light radiation intensity is lower than 60% of a daily average value in a whole year, it is determined to be a cloudy day, and in such period, the sunlight tracking device is not switched to the close loop control mode but continues operating according to the astronomical azimuth. Then the sunlight is output by the light conduction components to the photoreactor where the photoreaction is carried out. The measured data are then treated and displayed by the functional software in the upper PC.

Example 3

In this example, a multi-layer convex lens group formed by a plurality of convex lens groups is employed to substitute the convex lens 1b for converging the sunlight in the above two examples, while other structures and the working principles of the system are the same as the above described examples.

Figure 7:
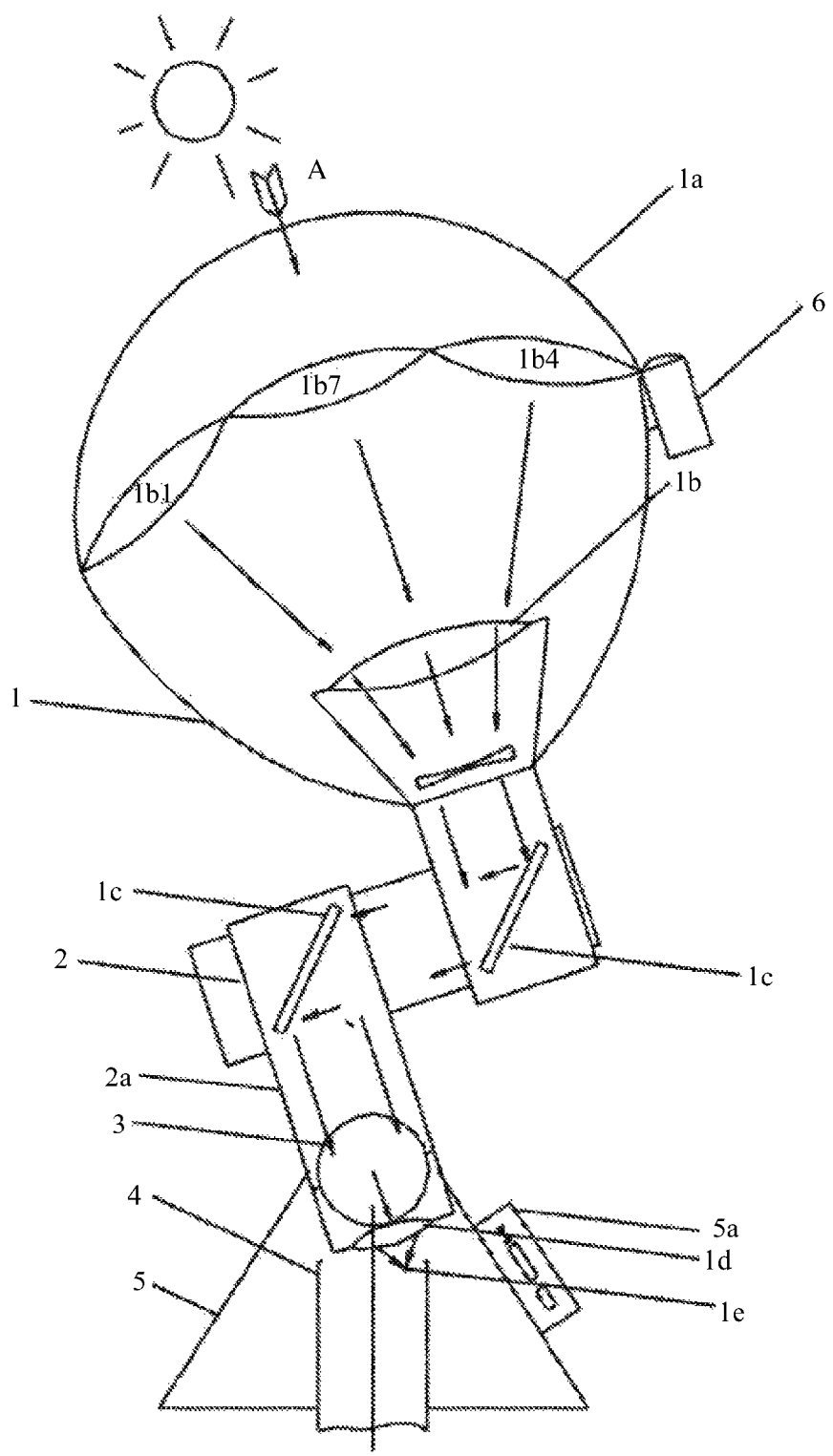
FIG. 7 is a structure diagram of a photocatalytic reaction system adopting a double-layer of convex lens group having seven convex lenses arranged at a top layer according to one embodiment of the invention.
Figure 8:
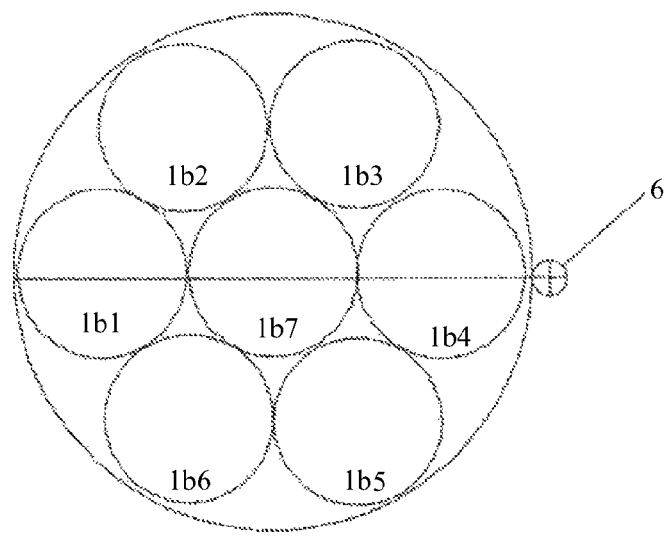
FIG. 8 is a structure diagram showing arrangement of convex lenses of a top layer of FIG. 7 (a view taken from an A-side of FIG. 7)

FIGS. 7-8 illustrate a combination of double layers of convex lens groups with a top layer formed by seven convex lenses 1b1-1b7. Under the cooperation of a pitch motion and an azimuthal motion, the 2-DOF bracket is able to track the sunlight and enables the focus of the sunlight to always fall on the convex lens of the bottom layer.

FIGS. 10-13 illustrate that the top layer of the convex lens group is formed by two, three, four, and five convex lenses, respectively.

In FIGS. 7-8, 10-13, the convex lens of the bottom layer for converging the sunlight is called a primary convex lens, and N (N represents a positive integer) convex lenses of the top layer is arranged above the primary convex lens. The convex lenses of the top layer are arranged in order according to the optical converging principle, so that all the focuses of the convex lenses of the top layer fall on the convex lens of the bottom layer. Thus, the system formed by the two layers of the converging lenses are called a telescopic convex lens group, and the number N of the convex lenses of the top layer can be two, three, four, five, six, seven, etc.

In the same way, N (N is a positive integer) convex lenses of the top layer can be arranged above the convex lenses of a penultimate layer to allow the focuses of the convex lenses of the top layer to fall on the convex lenses of the penultimate layer, thus, the effective area for collecting the sunlight is further enlarged.

The above arrangement of the multiple layer of convex lenses are described as follows: the telescopic convex lens for converging the sunlight is a convex lens group formed by N convex lenses according to the optical converging principle, and N represents an integer.

In summary, because the light collecting apparatus is formed by a servo control system for automatically tracking the elevation angle and the azimuth angle of the sun and the optic system for collecting, converging, conducting, and transmitting the sunlight, the photocatalytic reaction system of the invention is capable of fluently transmitting the sunlight to the indoor photoreactor, so that the process of photocatalytic decomposition of $H_2O$ for hydrogen production and the process of photocatalytic decomposition of ($H_2O+CO_2$) for methanol production are conducted under the full-spectrum rays of the sunlight in a real sense.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A photocatalytic reaction system, comprising:
   a light collector, the light collector comprising: a housing, a protective cover, a light-collecting convex lens group, a solar radiation measuring device, a two-degree-of-freedom bracket, a base, servo motors, and a data collection control box; the two-degree-of-freedom bracket comprising a pitch main shaft and an azimuthal main shaft
   a light conduction device; and
   a photoreactor, the photoreactor comprising: a light transmitting cylinder, a sealing cover, a reaction gas inlet, reaction gas outlets, a reaction solution inlet, a reaction solution outlet, a temperature sensor, and a pressure sensor;

wherein the protective cover is transparent and disposed on a top of the housing of the light collector; the light-collecting convex lens group is formed by at least one lens arranged in multiple layers, and the light-collecting convex lens group is disposed beneath the protective cover in a transmission direction of the sunlight; the housing of the light collector is provided with the solar radiation measuring device; the pitch main shaft and the azimuthal main shaft are connected to form the two-degree-of-freedom bracket; a bottom of the housing of the light collector is fixed on an end of the pitch main shaft; the azimuthal main shaft is disposed at a bottom of the two-degree-of-freedom bracket and connected to the base via a bearing; the azimuthal main shaft and the pitch main shaft are separately provided with the servo motors and able to rotate in relation to each other by tracking the sunlight under the drive of the separate servo motors; the base is provided with the data collection control box;

the sunlight collected by the light-collecting convex lens group is converged into a convergent light when passing through the light conduction device and the convergent light is directed to the photoreactor;

the photoreactor is capable of transmitting full-spectrum rays of sunlight; the sealing cover is disposed on the light transmitting cylinder; the light transmitting cylinder is filled with a reaction solution, and the reaction solution communicates with an external via the reaction gas inlet, the reaction gas outlets, the reaction solution inlet, and the reaction solution outlet disposed on the photoreactor; the photoreactor is provided with the temperature sensor and the pressure sensor; and the temperature sensor, the pressure sensor, and the solar radiation measuring device are in signal connection with the data collection control box, and the data collection control box is in electric connection with the servo motors.

2. The system of claim 1, wherein the light-collecting convex lens group is the multiple layers of the convex lenses distributed from the top down in a direction of an optical path; focuses of at least two convex lenses of a top layer fall on an adjacent next layer of the convex lenses, distribution of the focuses of the convex lenses of a following layer is in the same way, and the focuses of the convex lenses of a penultimate layer fall on the convex lens of a bottom layer; and the light conduction device is a flexible fiber-optic bundle and the convex lens of the bottom layer is coupled to the fiber-optic bundle; or the light conduction device is a light conduction cylinder, a concave lens is disposed beneath the convex lens of the bottom layer of the light-collecting convex lens group, the concave lens and the light-collecting convex lens group together form a convex-concave lens group, and the convex-concave lens group is coupled to the light conduction cylinder and converts the sunlight into a parallel light.

3. The system of claim 2, wherein the light conduction device is the flexible fiber-optic bundle, and a front end thereof is vertically fixed on the housing of the light collector;

a focus of the convex lens of the bottom layer of the light-collecting convex lens group falls on a light receiving face of the flexible fiber-optic bundle; and a rear end of the flexible fiber-optic bundle is provided with a rear end lens group for converging and directing the light to the light transmitting cylinder.

4. The system of claim 2, wherein the light conduction device is the light conduction cylinder having a front end being vertically fixed; the convex-concave lens group coupled to the light conduction cylinder is disposed in the housing of the light collector; the pitch main shaft and the azimuthal main shaft connected to the housing of the light collector are both hollow cylinders having inner walls provided with reflective films, and the optical paths in the hollow cylinders of the pitch main shaft and the azimuthal main shaft communicate with each other;

a pair of reflectors are disposed in parallel in the pitch main shaft, and an angle between an axis of the pitch main shaft and each reflector is 45o; a convex lens is disposed at a bottom of the azimuthal main shaft, an angle between an axis of the azimuthal main shaft and the convex lens is 90o, a focus of the convex lens falls in an inlet of the front end of the light conduction cylinder, and the focus of the convex lens coincides with an axis of the light conduction cylinder at 12:00 of local astronomical time; and a rear end of the light conduction cylinder is provided with a rear end lens group for converting the light into the parallel light and transmitting the parallel light to the light conduction cylinder.

5. The system of claim 2, wherein the light conduction device comprises at least one flection; and the light passing through the rear end lens group is directed to the light transmitting cylinder via a sidewall or a bottom of the light transmitting cylinder.

6. The system of claim 3, wherein the light conduction device comprises at least one flection; and the light passing through the rear end lens group is directed to the light transmitting cylinder via a sidewall or a bottom of the light transmitting cylinder.

7. The system of claim 4, wherein the light conduction device comprises at least one flection; and the light passing through the rear end lens group is directed to the light transmitting cylinder via a sidewall or a bottom of the light transmitting cylinder.

8. The system of claim 5, wherein the protective cover, the convex lenses, the concave lens, the fiber-optic bundle, and the rear end lens group are all made of materials that are capable transmitting the full-spectrum rays of the sunlight; and materials of the reflectors and a reflective film covered on an inner surface of the light conduction cylinder have an absorption rate or a filtration rate of an ultraviolet light, a visible light, and an infrared light of ≤6%.

9. The system of claim 6, wherein the protective cover, the convex lenses, the concave lens, the fiber-optic bundle, and the rear end lens group are all made of materials that are capable transmitting the full-spectrum rays of the sunlight; and materials of the reflectors and a reflective film covered on an inner surface of the light conduction cylinder have an absorption rate or a filtration rate of an ultraviolet light, a visible light, and an infrared light of ≤6%.

10. The system of claim 7, wherein the protective cover, the convex lenses, the concave lens, the fiber-optic bundle, and the rear end lens group are all made of materials that are capable transmitting the full-spectrum rays of the sunlight; and materials of the reflectors and a reflective film covered on an inner surface of the light conduction cylinder have an absorption rate or a filtration rate of an ultraviolet light, a visible light, and an infrared light of ≤6%.

11. The system of claim 1, wherein a power module, a CPU module, a communication module, a signal input module, a signal output module, a storage module, and mounting rails are disposed inside the data collection control box; and the modules are fixed on a casing of the data collection control box via the mounting rails, respectively;

system serial ports, an input/output signal interface, and a power interface are disposed on a sidewall of the data collection control box; and the communication module in the control box communicates with an upper PC via the system serial ports; the signal input module, the signal output module are in signal connection with the solar radiation measuring device and the servo motors respectively via the input/output signal interface; and the power interface is connected to an external power, and the external power adopts an AC 220V power, a DC24V power, or a silicon photovoltaic cell.

12. The system of claim 2, wherein a power module, a CPU module, a communication module, a signal input module, a signal output module, a storage module, and mounting rails are disposed inside the data collection control box; the modules are fixed on a casing of the data collection control box via the mounting rails, respectively;

system serial ports, an input/output signal interface, and a power interface are disposed on a sidewall of the data collection control box; and the communication module in the control box communicates with an upper PC via the system serial ports; the signal input module, the signal output module are in signal connection with the solar radiation measuring device and the servo motors respectively via the input/output signal interface; and the power interface is connected to an external power, and the external power adopts an AC 220V power, a DC24V power, or a silicon photovoltaic cell.

13. The system of claim 3, wherein a power module, a CPU module, a communication module, a signal input module, a signal output module, a storage module, and mounting rails are disposed inside the data collection control box; the modules are fixed on a casing of the data collection control box via the mounting rails, respectively;

system serial ports, an input/output signal interface, and a power interface are disposed on a sidewall of the data collection control box; and the communication module in the control box communicates with an upper PC via the system serial ports; the signal input module, the signal output module are in signal connection with the solar radiation measuring device and the servo motors respectively via the input/output signal interface; and the power interface is connected to an external power, and the external power adopts an AC 220V power, a DC24V power, or a silicon photovoltaic cell.

14. The system of claim 4, wherein a power module, a CPU module, a communication module, a signal input module, a signal output module, a storage module, and mounting rails are disposed inside the data collection control box; the modules are fixed on a casing of the data collection control box via the mounting rails, respectively;

system serial ports, an input/output signal interface, and a power interface are disposed on a sidewall of the data collection control box; and the communication module in the control box communicates with an upper PC via the system serial ports; the signal input module, the signal output module are in signal connection with the solar radiation measuring device and the servo motors respectively via the input/output signal interface; and the power interface is connected to an external power, and the external power adopts an AC 220V power, a DC24V power, or a silicon photovoltaic cell.

15. The system of claim 10, wherein a power module, a CPU module, a communication module, a signal input module, a signal output module, a storage module, and mounting rails are disposed inside the data collection control box; the modules are fixed on a casing of the data collection control box via the mounting rails, respectively;

system serial ports, an input/output signal interface, and a power interface are disposed on a sidewall of the data collection control box; and the communication module in the control box communicates with an upper PC via the system serial ports; the signal input module, the signal output module are in signal connection with the solar radiation measuring device and the servo motors respectively via the input/output signal interface; and the power interface is connected to an external power, and the external power adopts an AC 220V power, a DC24V power, or a silicon photovoltaic cell.

16. The system of claim 1, wherein the reaction solution inlet is disposed on a sidewall of the light transmitting cylinder, and the reaction solution outlet is disposed on a bottom of the light transmitting cylinder;

the sealing cover is provided with a plurality of the reaction gas outlets, and the reaction gas inlet for inserting a reaction gas tube into the reaction solution at the bottom of the light transmitting cylinder; and the temperature sensor is inserted into the reaction solution in the light transmitting cylinder; and a pressure transmission tube of the pressure sensor is disposed in a gas region in the light transmitting cylinder.

17. The system of claim 2, wherein the reaction solution inlet is disposed on a sidewall of the light transmitting cylinder, and the reaction solution outlet is disposed on a bottom of the light transmitting cylinder;

the sealing cover is provided with a plurality of the reaction gas outlets, and the reaction gas inlet for inserting a reaction gas tube into the reaction solution at the bottom of the light transmitting cylinder; and the temperature sensor is inserted into the reaction solution in the light transmitting cylinder; and a pressure transmission tube of the pressure sensor is disposed in a gas region in the light transmitting cylinder.

18. The system of claim 3, wherein the reaction solution inlet is disposed on a sidewall of the light transmitting cylinder, and the reaction solution outlet is disposed on a bottom of the light transmitting cylinder;

the sealing cover is provided with a plurality of the reaction gas outlets, and the reaction gas inlet for inserting a reaction gas tube into the reaction solution at the bottom of the light transmitting cylinder; and the temperature sensor is inserted into the reaction solution in the light transmitting cylinder; and a pressure transmission tube of the pressure sensor is disposed in a gas region in the light transmitting cylinder.

19. The system of claim 4, wherein the reaction solution inlet is disposed on a sidewall of the light transmitting cylinder, and the reaction solution outlet is disposed on a bottom of the light transmitting cylinder;

the sealing cover is provided with a plurality of the reaction gas outlets, and the reaction gas inlet for inserting a reaction gas tube into the reaction solution at the bottom of the light transmitting cylinder; and the temperature sensor is inserted into the reaction solution in the light transmitting cylinder; and a pressure transmission tube of the pressure sensor is disposed in a gas region in the light transmitting cylinder.

20. The system of claim 10, wherein the reaction solution inlet is disposed on a sidewall of the light transmitting cylinder, and the reaction solution outlet is disposed on a bottom of the light transmitting cylinder;

the sealing cover is provided with a plurality of the reaction gas outlets, and the reaction gas inlet for inserting a reaction gas tube into the reaction solution at the bottom of the light transmitting cylinder; and the temperature sensor is inserted into the reaction solution in the light transmitting cylinder; and a pressure transmission tube of the pressure sensor is disposed in a gas region in the light transmitting cylinder.

\* \* \* \* \*